United States Patent
Kawabata et al.

(10) Patent No.: US 7,762,150 B2
(45) Date of Patent: Jul. 27, 2010

(54) LOAD DETECTING DEVICE FOR VEHICLE SEAT

(75) Inventors: Hideki Kawabata, Aichi-ken (JP); Muneto Inayoshi, Anjo (JP); Kan Ichihara, Kariya (JP); Hiroyuki Fujii, Kariya (JP); Kenichiro Akizuki, Aichi-ken (JP); Minoru Izawa, Okazaki (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 58 days.

(21) Appl. No.: 11/765,699

(22) Filed: Jun. 20, 2007

(65) Prior Publication Data

US 2008/0007100 A1    Jan. 10, 2008

(30) Foreign Application Priority Data

Jun. 23, 2006    (JP)    ............................. 2006-174222

(51) Int. Cl.
　　G01L 1/04　　(2006.01)
　　G01L 1/22　　(2006.01)
　　G01G 19/52　　(2006.01)
　　A47C 3/03　　(2006.01)

(52) U.S. Cl. ............................ 73/862.474; 73/862.471; 73/862.451; 73/862.473; 177/144; 297/217.2

(58) Field of Classification Search ............ 73/862.451; 177/144; 297/217.2; 280/735
See application file for complete search history.

(56) References Cited

U.S. PATENT DOCUMENTS

| | | | |
|---|---|---|---|
| 6,323,443 B1 | 11/2001 | Aoki et al. | |
| 6,356,200 B1 * | 3/2002 | Hamada et al. | ............. 177/144 |
| 6,397,688 B1 * | 6/2002 | Sakamoto et al. | ........... 177/144 |
| 6,561,300 B1 | 5/2003 | Sakamoto et al. | |
| 6,571,647 B1 * | 6/2003 | Aoki et al. | .................. 177/144 |
| 6,617,531 B1 * | 9/2003 | Aoki | ........................... 177/144 |
| 6,732,593 B2 | 5/2004 | Sakamoto et al. | |
| 6,841,741 B2 * | 1/2005 | Kajiyama | .................... 177/144 |

(Continued)

FOREIGN PATENT DOCUMENTS

JP　　2001-158268　　6/2001

(Continued)

*Primary Examiner*—Lisa M Caputo
*Assistant Examiner*—Jonathan Dunlap
(74) *Attorney, Agent, or Firm*—Oblon, Spivak, McClelland, Maier & Neustadt, L.L.P.

(57) ABSTRACT

A load detecting device for a vehicle seat includes a supporting base adapted to be mounted on a floor of the vehicle, a plurality of load sensors arranged along a forward and backward direction of a seat for the vehicle on the supporting base, the load sensors including a load input portion, a deflection portion deflecting by a load and a deflection gauge measuring an amount of deflection, the load sensors detecting the load based on the amount of deflection measured by the deflection gauge, a connecting member connecting the load input portions, a seat supporting member connected to the connecting member and adapted to support the seat for the vehicle, the seat supporting member transmitting load to the connecting member, and a stopper preventing deformation of the connecting member in a vertical direction of the seat when load which exceeding a predetermined value is applied to the connecting member.

20 Claims, 8 Drawing Sheets

U.S. PATENT DOCUMENTS

| | | | |
|---|---|---|---|
| 6,916,997 B2 * | 7/2005 | Thakur et al. | 177/144 |
| 6,981,717 B2 | 1/2006 | Sakamoto et al. | |
| 7,000,489 B2 * | 2/2006 | Kobata et al. | 73/862.391 |
| 7,096,745 B2 * | 8/2006 | Kobata | 73/862.041 |
| 7,297,880 B2 * | 11/2007 | Sulkowski et al. | 177/144 |
| 7,328,627 B2 * | 2/2008 | Kawabata et al. | 73/862.627 |
| 7,360,460 B2 * | 4/2008 | Diehl et al. | 73/862.391 |
| 7,399,932 B2 * | 7/2008 | Kajiyama et al. | 177/136 |
| 2004/0187609 A1 * | 9/2004 | Nishio et al. | 73/862.474 |
| 2005/0061643 A1 * | 3/2005 | Rainey | 338/47 |
| 2008/0036251 A1 * | 2/2008 | Endo et al. | 297/217.2 |

FOREIGN PATENT DOCUMENTS

| | | |
|---|---|---|
| JP | 2003-83798 | 3/2003 |
| JP | 2003-83799 | 3/2003 |
| JP | 3683712 | 6/2005 |
| WO | WO 2006011599 A1 * | 2/2006 |

* cited by examiner

FIG. 8

LOAD DETECTING DEVICE FOR VEHICLE SEAT

CROSS REFERENCE TO RELATED APPLICATIONS

This application is based on and claims priority under 35 U.S.C §119 with respect to Japanese Patent Application 2006-174222, filed on Jun. 23, 2006, the entire content of which is incorporated herein by reference.

FIELD OF THE INVENTION

This invention relates to a load detecting device for a vehicle seat. More specifically, the invention relates to improvement of a structure in a load detecting device for a vehicle seat for measuring load applied to a seat for a vehicle.

BACKGROUND

For example, a mechanism is provided for moving a seating surface for a vehicle up and down via a link. In association with the mechanism, a load detecting device for a vehicle seat, which measures load applied to the seat for the vehicle, is used as follows. The device is used for controlling an airbag. For example, the airbag is switched on and off according to the detected load value. Many of the load detecting devices for the vehicle seat use a load cell. The load cell measures an amount of strain generated at a censor strain portion and detects the load based on the measurement of the amount of strain.

Conventionally, with regard to the above-mentioned load detecting device for the vehicle seat, a device provided with a deflection controlling mechanism is proposed. The deflection controlling mechanism directly restrains a strain generated at the sensor strain portion against an excessive load that is applied to the sensor strain portion during the impact of the vehicle. For example, refer to JP 3683712. The mechanism is provided as a preventing means for deforming the strain portion when a large load exceeding a predetermined value is applied. For example, the mechanism is composed of a control bar connected to a lower surface of seat rails and a control block formed on a seat fixed portion.

However, the above-mentioned deflection controlling mechanism is able to prevent the deformation of the sensor strain portion when the excessive load such as the one that is generated during the impact of the vehicle is applied. On the other hand, disadvantageously, frame components, with which the sensor strain portion and various types of sensor members contact, may deform during or after the impact. The deformation of the frame components unavoidably leads to degradation of sensor functionality.

The present invention has been made in view of the above circumstances, and provides a load detecting device for a vehicle seat restraining load detecting functionality of a seat for a vehicle from degrading when an excessive load generated during impact of the vehicle or similar situations is applied, and maintaining an operational state.

SUMMARY OF THE INVENTION

According to an aspect of the present invention, a load detecting device for a vehicle seat includes a supporting base adapted to be mounted on a floor of the vehicle, a plurality of load sensors arranged along a forward and backward direction of a seat for the vehicle on the supporting base, each of the load sensors including a load input portion applied with load, a deflection portion deflecting by a load transmitted from the load input portion and a deflection gauge measuring an amount of deflection generated at the deflection portion, the load sensors detecting the load based on the amount of deflection measured by the deflection gauge, a connecting member connecting the load input portions of the load sensors arranged along the forward and backward direction of the seat, a seat supporting member connected to the connecting member and adapted to support the seat for the vehicle, the seat supporting member transmitting load applied to the seat to the connecting member; and a stopper preventing deformation of the connecting member at least in a vertical direction of the seat when load which exceeding a predetermined value is applied to the connecting member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Details of a structure of the present invention will be described based on an example of embodiments illustrated in figures.

FIGS. 1 to 8 illustrate embodiments of the present invention. In FIGS. 1, 3, 5 and 8, a horizontal direction of the page corresponds to a forward and backward direction of a vehicle and a left side of the page corresponds to a front side of the vehicle. Also, a vertical direction of the page corresponds to a vertical direction of the vehicle and an upper side of the page corresponds to an upper side of the vehicle. A load detecting device for a vehicle seat 1 according to embodiments of the present invention measures load applied to a seat for a vehicle 2. In embodiments described below, the load detecting devices for the vehicle seat 1 is provided with a supporting base 3 fixed on a floor of the vehicle 21, a plurality of load sensors 4 and 5, a connecting member 6, and a seat supporting member 7. The load sensors 4 and 5 are arranged at least along a forward and backward direction of the seat for the vehicle 2 on the supporting base 3. Load input portions 4*a* and 5*a* of the load sensors 4 and 5, which are arranged along the forward and backward direction of the seat for the vehicle 2, are connected by the connecting member 6. The load detecting device for the vehicle seat 1 is further provided with a stopper 8 for preventing the connecting member 6 from deforming at least in the vertical direction when a load exceeding a predetermined value (the load is referred to as an excessive load hereinafter), for example a load generated during impact of the vehicle, is applied.

The seat for the vehicle 2 is provided for passengers in the vehicle or the like. In the seat for the vehicle 2, a lifting mechanism, which moves seating surfaces up or down via a link, may also be provided. In association with the lifting mechanism, the load detecting device for the vehicle seat 1 according to the embodiment of the present invention may be also provided.

The supporting base 3 is a base supporting the seat for the vehicle 2 and is fixed to the vehicle. The supporting base 3 may have various shapes and mechanisms. In the embodiments, the supporting base 3 is composed of brackets 31 and 32, lower rails 33 and upper rails 34 (refer to FIG. 1 and other figures).

The brackets 31 and 32 are supporting members that are mounted to the floor of the vehicle 21 at one end portion thereof to be fixed. The brackets 31 and 32 also support the lower rail 33 at the other end thereof. In the embodiments, the front bracket 31 and the rear bracket 32 are respectively arranged in a front side and in a rear side to support the lower rail 33 (refer to FIG. 1 and other figures).

The lower rails 33 are fixed to the brackets 31 and 32 and one lower rail 33 is disposed at each of left and right sides of the seat for the vehicle 2 so as to extend in the forward and backward direction. One upper rail 34 is provided along each lower rail 33 so as to be slidable in the forward and backward direction. The load sensors 4 and 5 are provided at each upper rail 34, and the upper rail 34 is further provided with the connecting member 6 and the seat supporting member 7 via the load sensors 4 and 5. (Refer to FIG. 1) The form of the upper rail 34 is not particularly limited. In the embodiments, each upper rail 34 is formed in a channel shape having a top board 34a so that the load sensors 4 and 5 can be readily mounted thereon.

Figure 1:
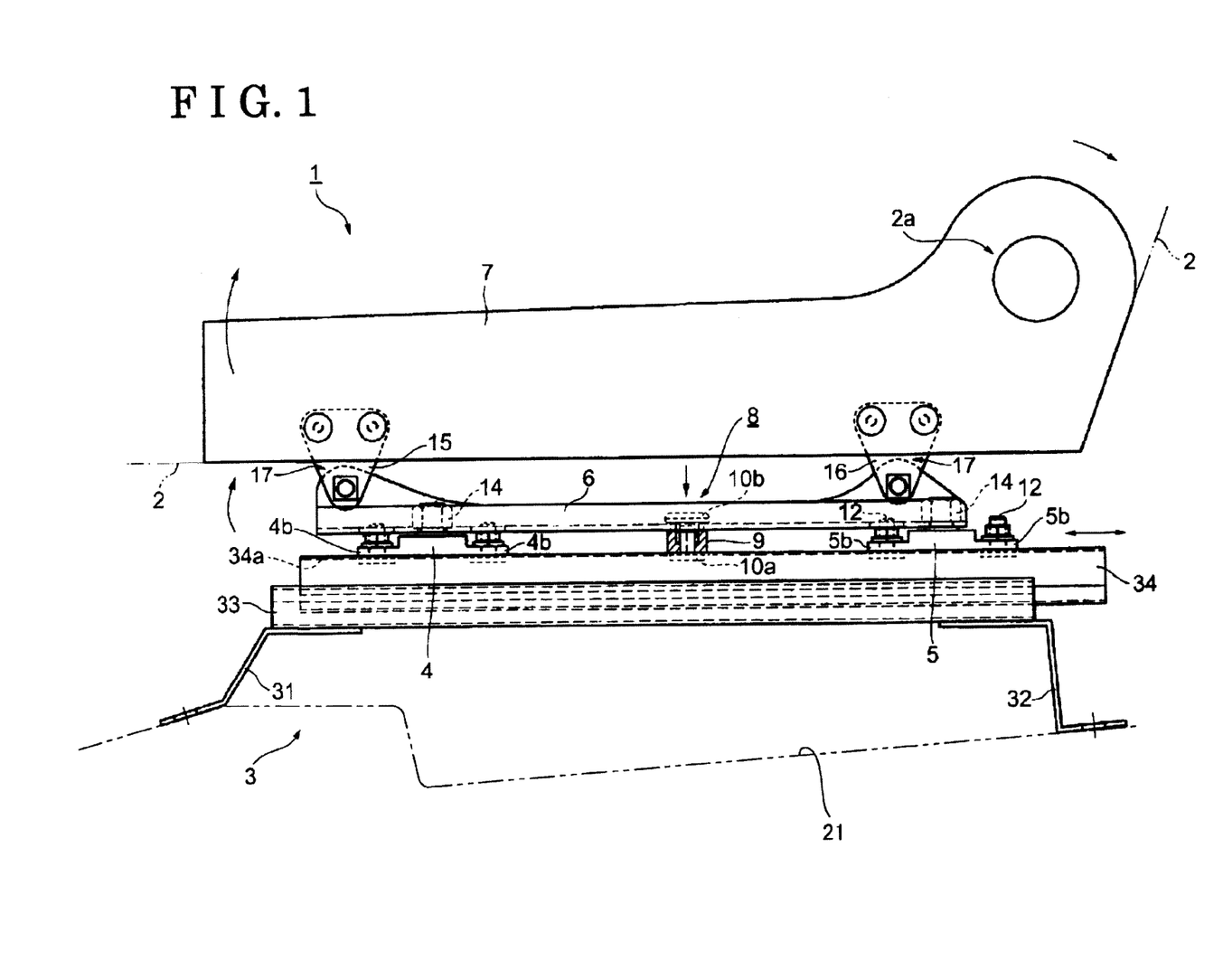
FIG. 1 is a side view illustrating a structure of a load detecting device for a vehicle seat according to a first embodiment of the present invention.
Figure 2:
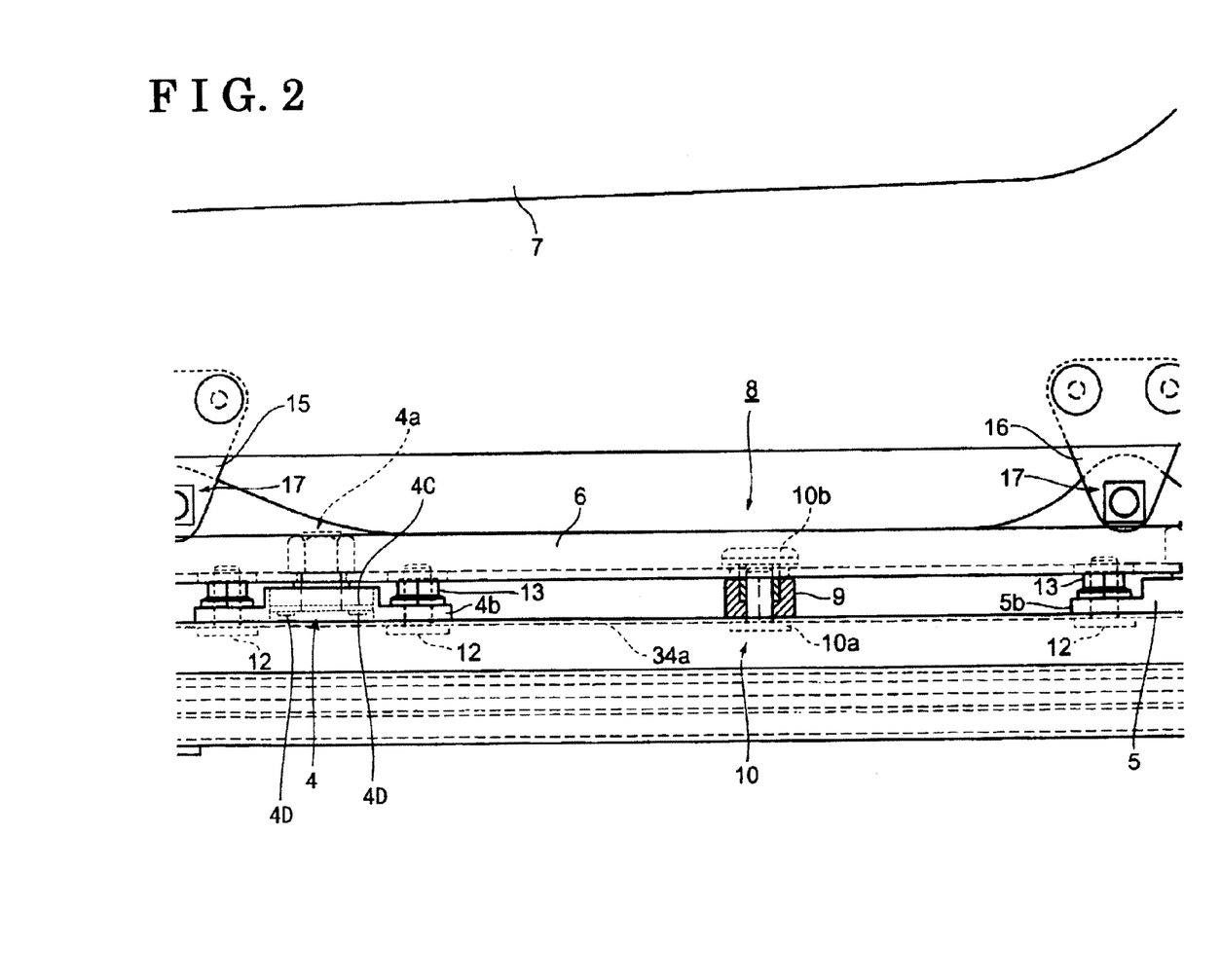
FIG. 2 is an enlarged view illustrating details of the structure of the load detecting device for the vehicle seat shown in FIG. 1.
Figure 8:
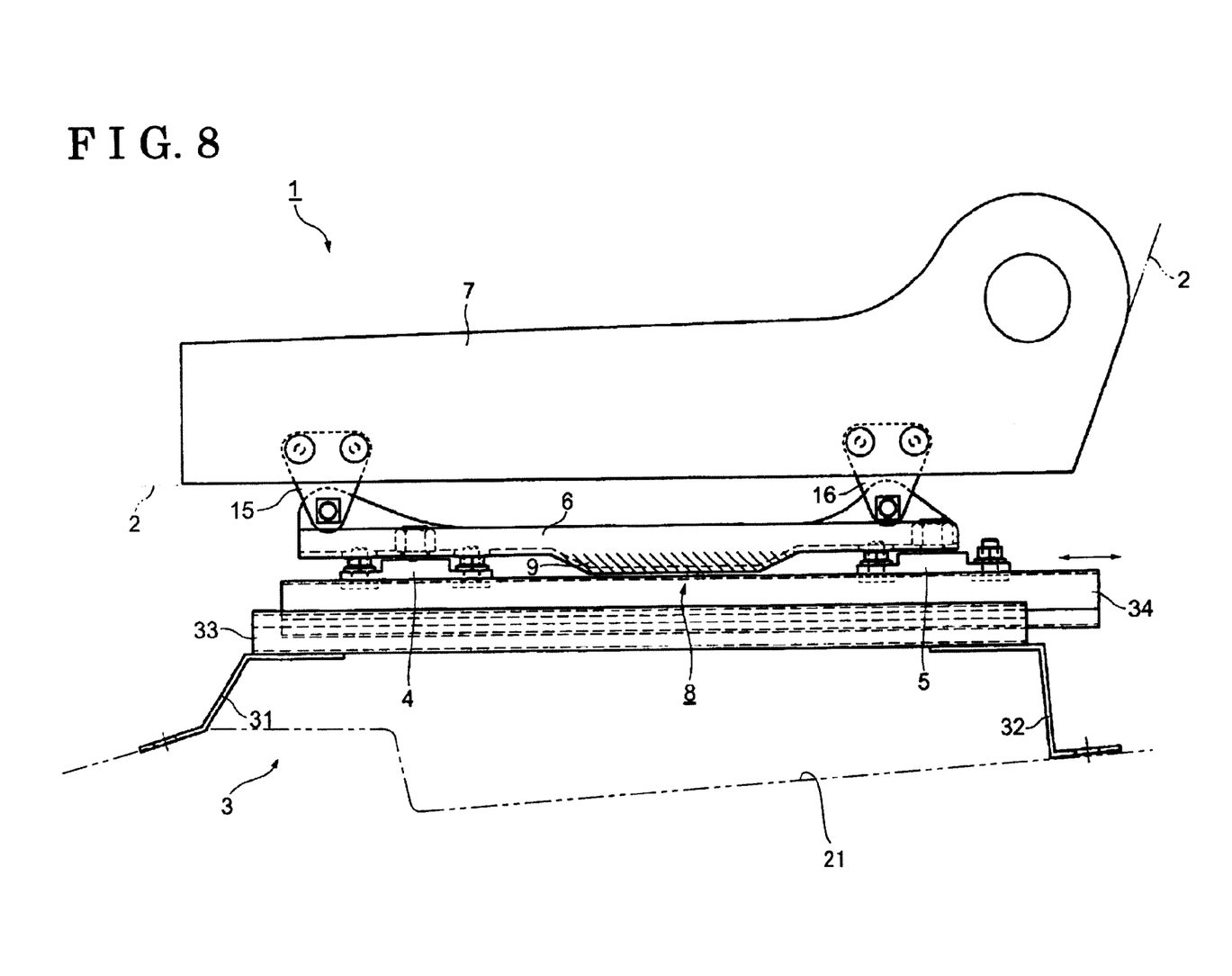
FIG. 8 is a side view illustrating a structure of a load detecting device for a vehicle seat according to a fifth embodiment of the present invention.

Each of the load sensors 4 and 5 measure load based on an amount of strain generated at its strain portions 4c and 5c. Loads are transmitted from the load input portion 4a and 5a respectively and generate the strain in the corresponding strain portions 4c and 5c. As the load sensors 4 and 5, which compose the load detecting device for the vehicle seat 1, four sensors are arranged below the seat for the vehicle 2. More specifically, each sensor is arranged on a corner of the seat for the vehicle 2 and is used to measure the load applied thereto. In FIGS. 1 and 8, illustrated by side views, two sensors, i.e. the front and rear sensors, are shown. A reference numeral 4 is given to the front load sensor and a reference numeral 5 is given to the rear load sensor (refer to FIG. 1 and other figures).

Although details are not described herein, a brief summary of the load sensors 4 and 5 according to the embodiments will be stated as below. The load sensors 4 and 5 respectively use strain gauges 4d and 5d each serving as a deflection gauge, which measures the amount of strain of a metal when the load is applied and changes electric resistance according to the amount of strain (amount of deflection). After the measurement, the strain gauges 4d and 5d transmit a signal for detecting the load. An internal stress is generated in the strain portions 4c and 5c each serving as a deflection portion after receiving the load, and the load sensors 4 and 5 respectively detect imperceptible strains of the strain portions 4c and 5c caused by the internal stress. Also, the load input portions 4a and 5a, which are respectively provided at centers of the load sensors 4 and 5, are portions to which the load is applied from an exterior portion and are configured so as to generate strains in the above-described strain portions 4c and 5c. For example, in the embodiments, the loads are transmitted from the load input portions 4a and 5a via the connecting member 6 (refer to FIG. 1 and other figures). Upper end portions of the load input portions 4a and 5a are threaded so that nuts 14 can be threadedly engaged therewith. The strain gauges 4d and 5d and the strain portions 4c and 5c of the load sensors 4 and 5, which are employed in first, second, third, fourth, and fifth embodiments, are configured in an identical manner, and the load sensor 4 illustrated in FIG. 1 is shown as a representative example.

Flange portions 4b and 5b each having large diameters are formed in main portions of the load sensor 4 and 5 respectively, and the load sensors 4 and 5 are fixed by using holes provided at the flange portions 4b and 5b and bolts. For example, in the embodiments, bolts 12, which penetrate through the top plate 34a of the above-mentioned upper rail 34, further penetrate the flange portions 4b and 5b to be fastened by nuts 13 respectively. Thus, the load sensors 4 and 5 are fixed on the upper rail 34 (refer to FIG. 1 or other figures). In order to avoid interference of distal end portions of the bolts 12, holes are provided in the corresponding portions of the connecting member 6.

The connecting member 6 is a member that connects the load input portions 4a and 5a of the load sensors 4 and 5, which are arranged along the forward and backward direction. For example, in the embodiments, the connecting member 6 connects the load input portion 4a of the load sensor 4 to the load input portion 5a of the load sensor 5 with a nut 14 threadedly engaged with each load input portion (refer to FIG. 1 or other figures). Intermediate brackets 15 and 16 are respectively mounted to front and rear portions of the connecting member 6 by way of fastening means 17. Each fastening means 17 is composed of a bolt and a nut.

The intermediate brackets 15 and 16 are interposed between the connecting member 6 and the seat supporting member 7 and transmit the load applied to the seat for the vehicle 2. The arrangement of the intermediate brackets 15 and 16 is not particularly limited. For example, in the embodiments, the front intermediate bracket 15 is disposed at the front of the load sensor 4 and the rear intermediate bracket 16 is disposed at the front of the load sensor 5 (refer to FIG. 1 and other figures). Also, in the embodiments, the intermediate brackets 15 and 16 are disposed so that an offset of the intermediate bracket 15 relative to the load sensor 4 is larger than an offset of the intermediate bracket 16 relative to the load sensor 5.

The seat supporting member 7 supports the seat for the vehicle 2 and transmits the load applied to the seat for the vehicle 2 to the connecting member 6 via the intermediate brackets 15 and 16. The intermediate brackets 15 and 16 are mounted respectively at the front and the rear of the seat supporting member 7 of the embodiments.

An example of excessive load application, which is caused by the impact of the vehicle or the like, will be described hereinafter. The supporting base 3, configured as described above, and the likes are likely to receive the excessive load when the impact happens at a rear side of the vehicle. In this case, the load is applied in a manner that the seat for the vehicle 2 and the seat supporting member 7 bend backward (refer to an arrow in FIG. 1). Compared with this, since the seat for the vehicle 2 and the like rotate around a supporting point (refer to as 2a in FIG. 1) which is located in the vicinity of a passenger's buttocks, the supporting member 7 receives the load in a manner that the front of the supporting member 7 floats on air more than the rear thereof does (refer to FIG. 1). At this time, a front end portion of the connecting member 6 is strongly drawn upward via the front intermediate bracket 15 (refer to FIG. 1). However, as described above, the connecting member 6 is fixed to the load sensors 4 and 5 via nuts 14, and thus an intermediate portion of the connecting member 6 receives a downward force, i.e. a force attempting to deform the connecting member 6 in a v shape, as a result of the above-mentioned act of the force (refer to FIG. 1). The above-mentioned case is a case where the excessive load is applied. If the load is applied in a direction opposite to the above-described case, the connecting member 6 receives a reverse force, i.e. a force attempting to deform the intermediate portion of the connecting member 6 upwardly.

In the embodiments, a stopper 8 is provided as a prevention measure for deforming the connecting member 6 at least in a vertical direction even if the excessive load is applied. Namely, the stopper 8 controls movement of the connecting member 6 when the excessive load is applied during the impact of the vehicle and prevents the deformation of the connecting member 6 physically. From this viewpoint, the stopper 8 can be configured in various forms. For example, the stopper 8 can be configured by a protruding control member 9 provided between the load sensors 4 and 5 or the supporting base 3 and the connecting member 6. Alternately, the stopper 8 can be configured by a control member 10 sandwiching the connecting member 6 and the upper rail 34 so as to control the deformation of the connecting member 6 in a direction opposite to the upper rail 34. Specific structures and configurations of the stopper 8 will be described in each embodiment.

First Embodiment

The stopper 8 in the first embodiment is disposed in the vicinity of an intermediate position (a center) between the load sensor 4 and the load sensor 5 (refer to FIGS. 1 and 2), which are arranged along the forward and backward direction. An intermediate portion of the connecting member 6 is significantly deformed when the load is applied. Thus, the stopper 8 prevents the deformation of the connecting member 6 by physically controlling movement of the intermediate portion of the connecting member 6. Specifically, the stopper 8 is composed of a protruding control member 9 and a control member 10. The protruding control member 9 is interposed between the connecting member 6 and the upper rail 34 and controls the deformation of the connecting member 6 toward the supporting base 3. The control member 10 sandwiches the connecting member 6 and the upper rail 34 so as to control the deformation of the connecting member 6 in the direction opposite to the upper rail 34 (refer to FIGS. 1 and 2).

The protruding control member 9 is interposed between the connecting member 6 and the upper rail 34 as described above and functions as a bearer bar. In the embodiment, an annular member into which a bolt 10*a* penetrates is employed as the protruding control member 9 (refer to FIG. 2). The protruding control member 9 functions so as to control the deformation of the connecting member 6 toward the supporting base 3. The specific form of the annular member composing the protruding control member 9 is not particularly limited. For example, the annular member can be a simple pipe shape. However, in the embodiment, an annular member which is composed of a collar bush is employed. The collar bush is processed so that an inner surface thereof has two steps, and a cross section of the collar bush is formed in an approximately channel shape. Also, a clearance is formed between an upper end of the protruding control member 9 and a backside of the connecting member 6 (refer to FIG. 2). The clearance is formed to have a preferable width so that the movement of the connecting member 6 is not blocked by the protruding control member 9 when the normal load is applied, and the movement of the connecting member 6 is controlled when the excessive load due to the impact or the like is applied.

The other control member 10 controls the deformation of the connecting member 6 in the direction opposite to the supporting base 3. For example, the control member 10 is composed of a bolt 10*a* and a nut (refer to FIG. 2) 10*b*. The bolt 10*a* sandwiches the connecting member 6 and the supporting base 3 and the nut 10*b* has a flange, i.e., a nut shaped in a cap with a flange. Also, in the embodiment, the bolt 10*a* is threadedly engaged with a small diameter of the above-mentioned annular member (collar bush) and a part of the nut 10*b* is fitted in a large diameter of the annular member. In the embodiment, the bolt 10*a* is disposed at a lower side. However, it is possible to reverse the positions of the bolt 10*a* and the nut 10*b*. Further, a clearance is formed between the nut 10*b* and the backside of the connecting member 6 (refer to FIG. 2). Similarly to the above-mentioned case, the clearance is formed to have a preferable width so that the movement of the connecting member 6 is not blocked by the control member 10 when the normal load is applied, and the movement of the connecting member 6 is controlled when the excessive load due to the impact or the like is applied.

As described above, according to the embodiment of the load detecting device for the vehicle seat 1, the deformation of the connecting member 6 toward the supporting base 3 is controlled by the protruding control member 9 and the deformation of the connecting member 6 in the direction opposite to the supporting base 3 is controlled by the control member 10. The movement of the connecting member 6 is controlled or restrained when the excessive load is applied, and thus it is possible to effectively restrain or prevent the connecting member 6 to deflect to a deformation zone. Further, according to the embodiment of the load detecting device for the vehicle seat 1, even if backlash is caused immediately after the excessive load is applied and a reverse directional load is applied to the connecting member 6, it is possible to prevent the deformation of the connecting member 6.

Second Embodiment

Figure 3:
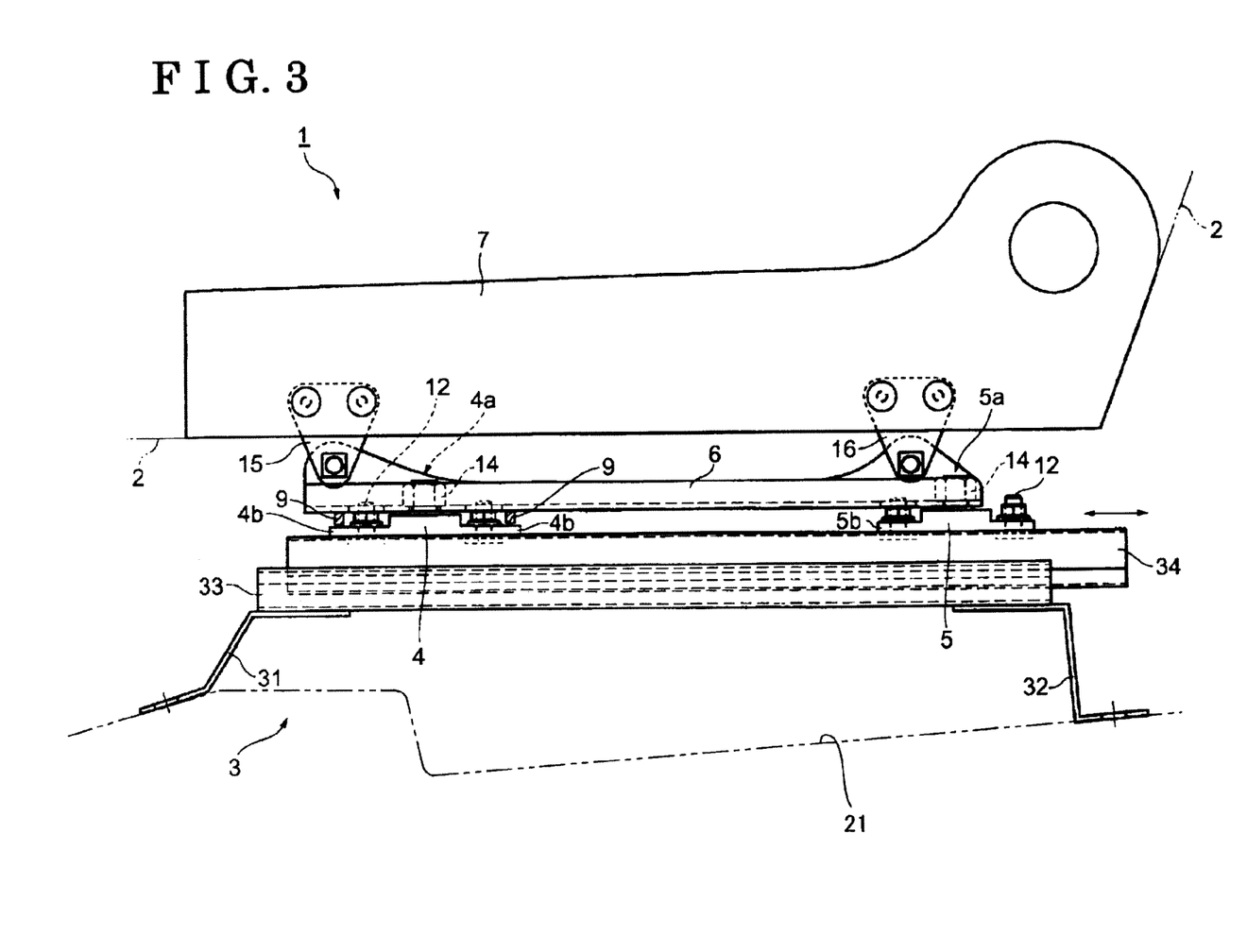
FIG. 3 is a side view illustrating a structure of a load detecting device for a vehicle seat according to a second embodiment of the present invention.
Figure 4:
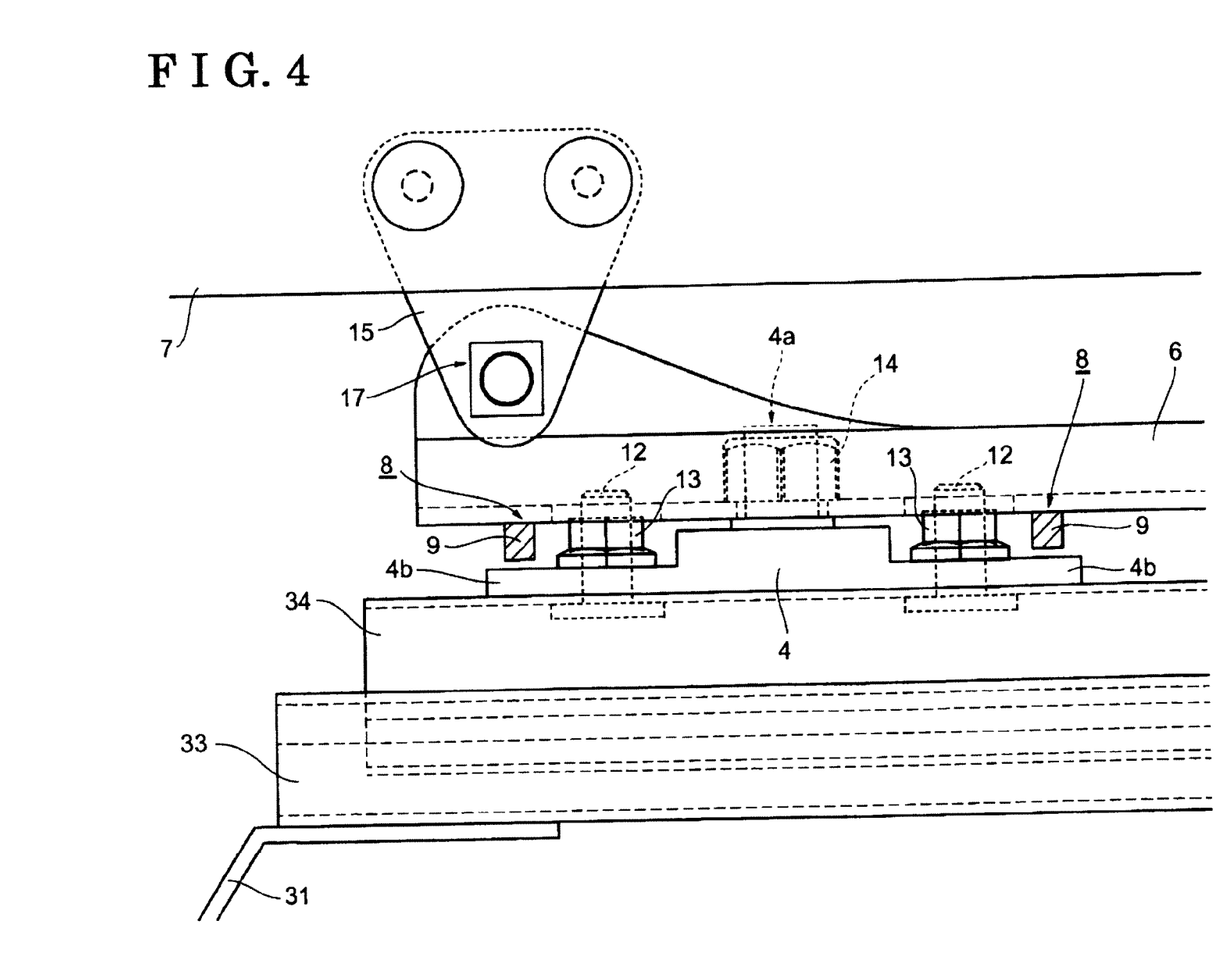
FIG. 4 is an enlarged view illustrating details of the structure of the load detecting device for the vehicle seat shown in FIG. 3.

The stopper 8 in the embodiment is composed of a protruding control member 9 formed in the connecting member 6 so as to be in contact with a part of the front load sensor 4 such as the flange portion 4*b* (refer to FIGS. 3 and 4). In the embodiment, the protruding control members 9 are provided at the front and at the rear of the load sensor 4 to control the movement of the connecting member 6 in both directions, the deformation of the connecting member 6 toward the supporting base 3 and the deformation of the connecting member 6 in the direction opposite to the supporting base 3. The protruding control member 9 may be formed by welding a member to the connecting member 6 or may be formed by cutting away a part of the connecting member 6. Any form of the protruding control member 9 can be acceptable as far as the movement of the connecting member 6 is controlled when the excessive load is applied. Also, it is preferable to dispose the protruding control member 9 at the front and at the rear of the rear load sensor 5. However, when the excessive load is applied, the front side of the connecting member 6 is more deflected in the load detecting device for the vehicle seat 1 according to the embodiment. Thus, it is possible to sufficiently control the movement of the connecting member 6 only by providing the protruding control members 9 in the vicinity of the front load sensor 4. Similarly to the above-described case, a clearance between a distal end of the protruding control member 9 and the flange 4b is formed to have a preferable width so that the movement of the connecting member 6 is not blocked by the protruding control member 9 when the normal load is applied, and the movement of the connecting member 6 is controlled when the excessive load due to the impact or the like is applied. In the second embodiment, the protruding control member 9 is provided at the connecting member 6, however, the protruding control member 9 is adversely provided in the flange portion 4b so as to protrude toward the connecting member 6.

Third Embodiment

Figure 5:
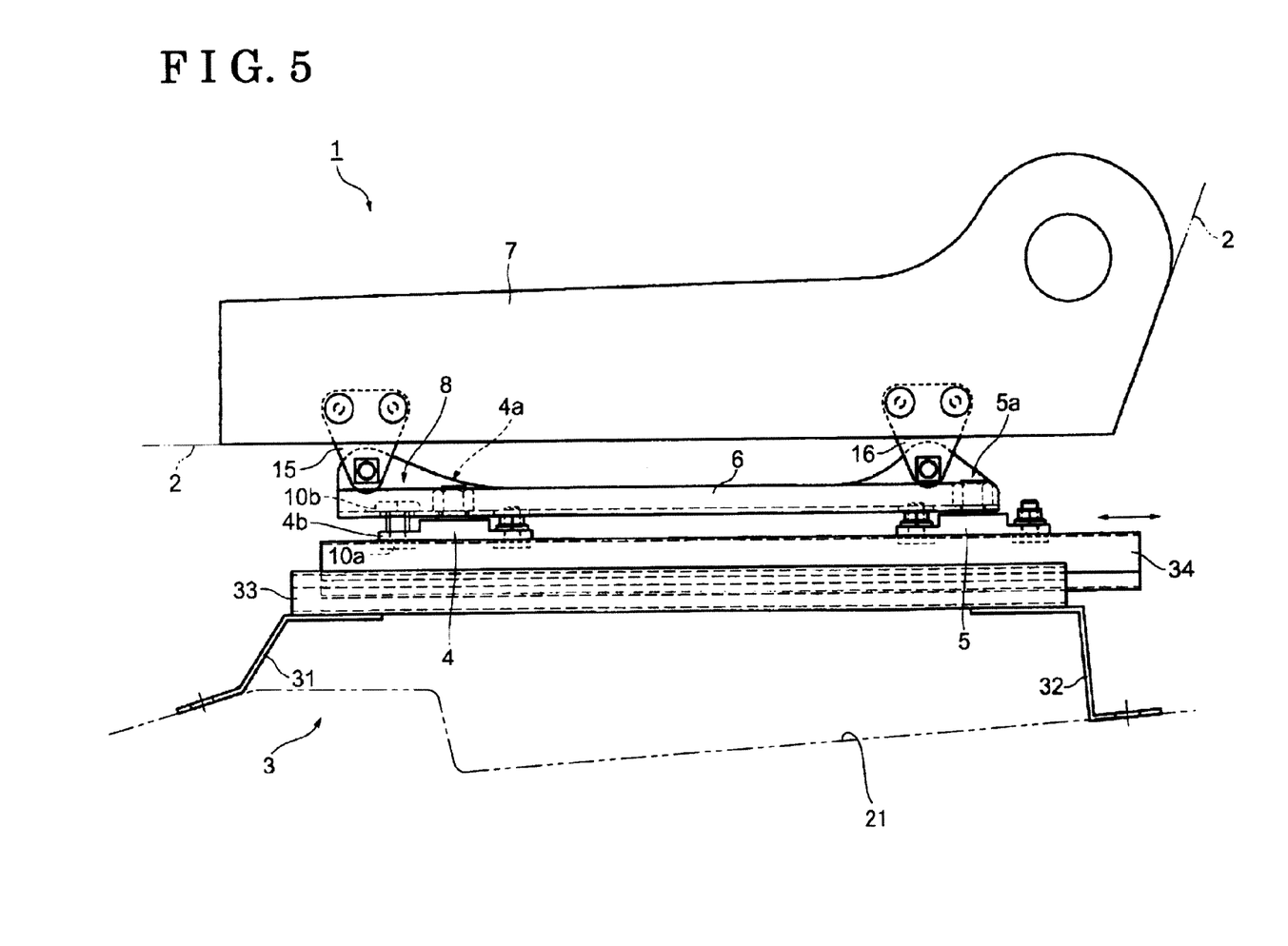
FIG. 5 is a side view illustrating a structure of a load detecting device for a vehicle seat according to a third embodiment of the present invention.
Figure 6:
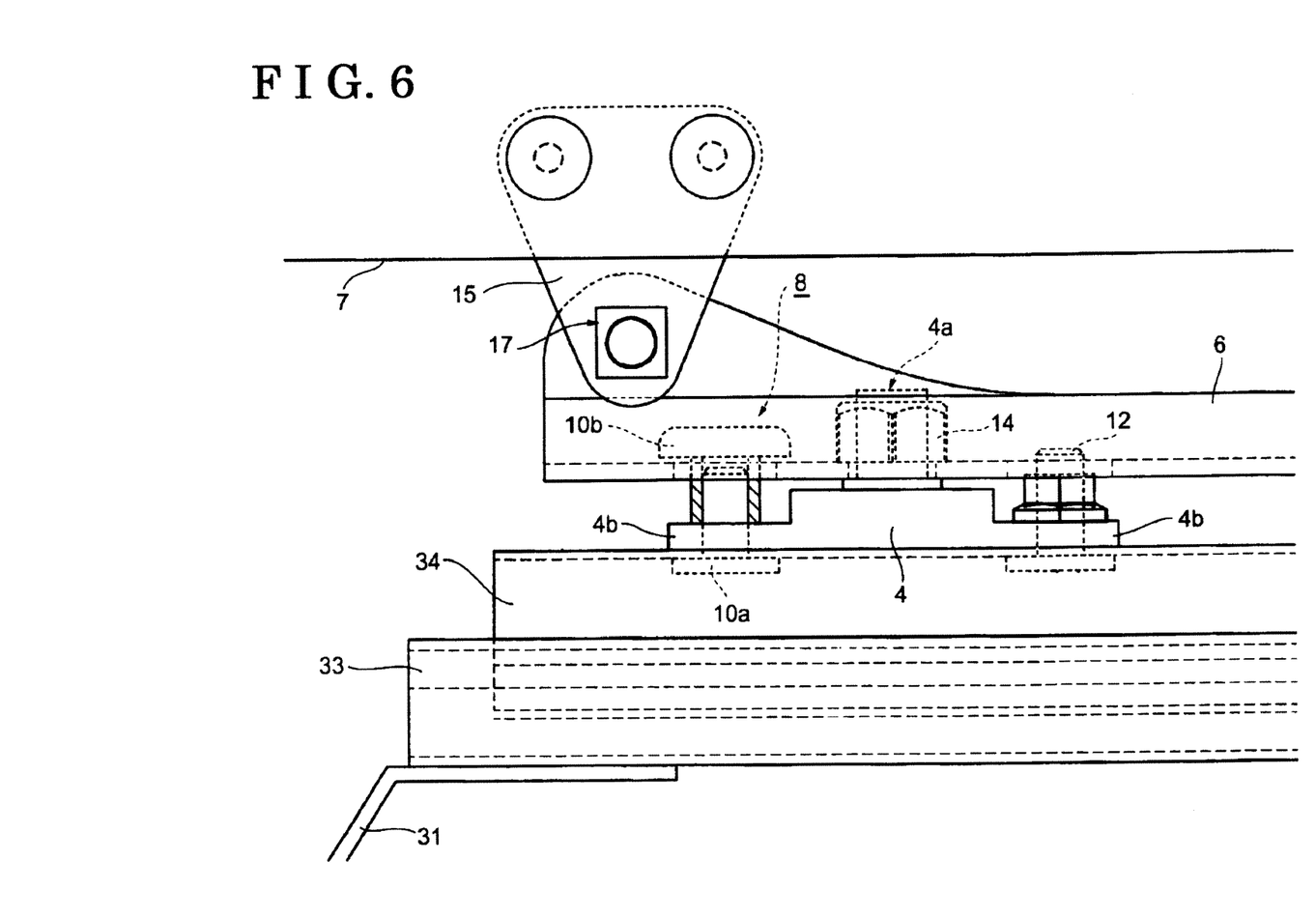
FIG. 6 is an enlarged view illustrating details of the structure of the load detecting device for the vehicle seat shown in FIG. 5.

The stopper 8 in the third embodiment is configured by providing a control member 10, which is composed of a bolt 10a and a nut 10b, so as to sandwich the flange portion 4b of the front load sensor 4 (and the upper rail 34) and the connecting member 6 (refer to FIGS. 5 and 6). The above-described control member 10 controls the deformation of the connecting member 6 in the direction opposite to the supporting base 3 at a position, i.e., the front side of the load sensor 4. In the embodiment, the bolt 10a is disposed at a lower side. However, it is possible to reverse the positions of the bolt 10a and the nut 10b. Similarly to the above-described case, a clearance between the nut 10b and the bottom surface of the connecting member 6 is formed to have a width so that the movement of the connecting member 6 is not blocked by the control member 10 when the normal load is applied, and the movement of the connecting member 6 is controlled when the excessive load due to the impact or the like is applied (refer to FIG. 6). The bolt 10a composing the above-described control member 10 may also be used as the bolt 12 for fixing the load sensor 4 on the upper rail 34.

Fourth Embodiment

Figure 7:
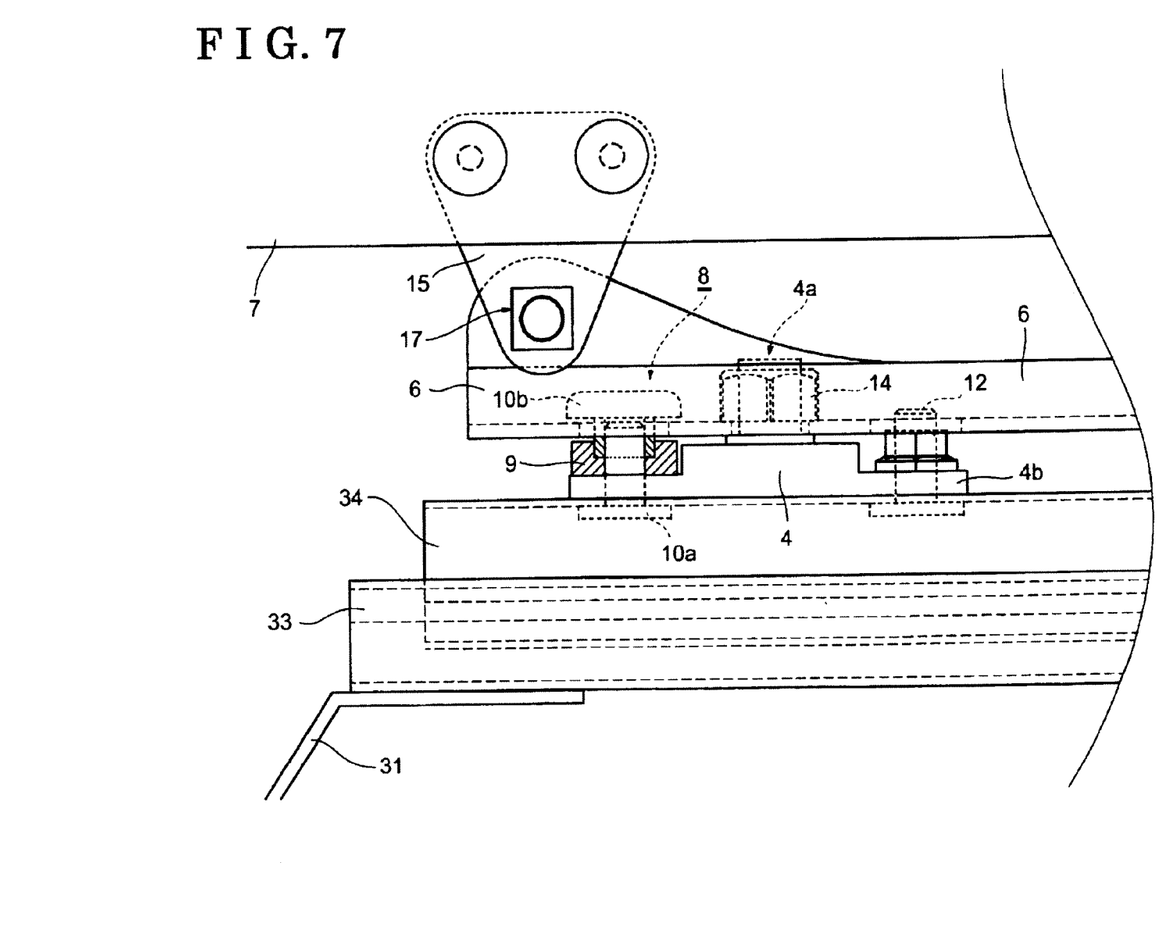
FIG. 7 is an enlarged view illustrating details of a structure of a load detecting device for a vehicle seat according to a fourth embodiment of the present invention.

The stopper 8 in the fourth embodiment is configured by adding a protruding control member 9 to the control member 10 of the third embodiment, which is composed of the bolt 10a and the nut 10b (refer to FIG. 7). Similarly to the above-described embodiment, the protruding control member 9 is interposed between the connecting member 6 and the upper rail 34 (in the embodiment, more specifically, the flange portion 4b) and functions as a bearer bar. The protruding control member 9 controls the deformation of the connecting member 6 toward the supporting base 3 at the position, i.e. the front side of the load sensor 4. An annular member into which the bolt 10a penetrates is employed as the protruding control member 9 (refer to FIG. 7). A clearance between the upper end of the protruding control member 9 and the backside of the connecting member 6 is formed to have a preferable width so that the movement of the connecting member 6 is not blocked by the protruding control member 9 when the normal load is applied, and the movement of the connecting member 6 is controlled when the excessive load due to the impact or the like is applied.

Fifth Embodiment

The stopper 8 in the fifth embodiment is configured by a protruding control member 9 formed in a part of the connecting member 6 (refer to FIG. 8). As just described, when the protruding control member 9 is configured by processing or deforming the part of the connecting member 6, it is possible to configure the stopper 8 without using additional components such as a bush. Thus, the advantage is that the device requires fewer components. A clearance between a lower end of the protruding control member 9 and an upper surface of the upper rail 34 is formed to have a preferable width so that the movement of the connecting member 6 is not blocked by the protruding control member 9 when the normal load is applied, and the movement of the connecting member 6 is controlled when the excessive load due to the impact or the like is applied. Also, in the embodiment, the protruding control member 9 is configured by the part of the connecting member 6 protruding downward. However, adversely, the protruding control member 9 may be configured by a part of the upper rail 34 protruding upward. Further, the protruding control member 9 may be configured by combining the both configurations.

Also, when the protruding control member 9 is formed in the part of the connecting member 6 as described above, it is preferable to form the protruding control member 9 in a rib shape, not shown in the figure, for example. At least the part of the connecting member 6 is formed in the rib shape, and thus bending stiffness thereof increases. Therefore, it is preferable that the connecting member 6 is less likely to deform when the load is applied from the exterior.

According to each embodiment of the load detecting device for the vehicle seat 1, even when the excessive load due to the impact of the vehicle or the like is applied, it is possible to restrain or prevent the deformation of the connecting member 6. Thus, when the excessive load is applied, influence of the load is restrained. As far as the load detecting device for the vehicle seat 1 is in an operational state, the measuring condition of the load applied to each the load sensor 4 and 5 are maintained as substantially equal as the measuring condition before the excessive load is applied. Thus, it is possible to prevent a load detecting functionality of the seat for the vehicle 2 from degrading and to maintain the operational state. In other words, it is possible to relieve or restrain the influence to the load sensors 4 and 5 indirectly by a unique structure specialized for the deformation prevention of the connecting member 6.

Also, in the load detecting device for the vehicle seat 1, an attempt to restrain a small deflection of the strain portions 4c and 5c generated in the inside of the load sensors 4 and 5 requires high precision of each component controlling the deflection as well as components for the sensors. Thus, the production cost may increase. However, according to the load detecting device for the vehicle seat 1 of the embodiments, the cost is not likely to increase. Further, the configurations of the clearances formed in each stopper 8 described above do not require very high precision. In this regard, it is possible to reduce the production cost.

The above-described embodiments are examples of preferable implementation of the present invention, however, the implementation of the present invention is not limited to those embodiments. For example, in the above-described embodiment, materials and other characteristics of the protruding control member 9 and the other control member 10, which configure the stopper 8, are not described in detail. The materials and other characteristics are not limited as far as these control members effectively prevent the deformation of the connecting member 6. Thus, it is possible to select the control members from among various types of forms.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A load detecting device for a vehicle seat comprising:
a supporting base adapted to be mounted on a floor of the vehicle;
a plurality of load sensors including at least one pair of front and rear load sensors arranged along a forward and backward direction of a seat for the vehicle on the supporting base, each of the load sensors including:
a load input portion;
a deflection portion that deflects in response to a load transmitted from the load input portion; and
a deflection gauge that measures an amount of deflection generated at the deflection portion, the load sensors detecting the load based on the amount of deflection measured by the deflection gauge;
a connecting member connecting the load input portions of the at least one pair of front and rear load sensors;
a seat supporting member formed separately from the connecting member and connected to the connecting member, the seat supporting member adapted to support the seat and transmit load applied to the seat to the connecting member; and
a stopper formed separately from and disposed between the at least one pair of front and rear load sensors, and that prevents deformation of the connecting member at least in a vertical direction of the seat when load exceeding a predetermined value is applied to the connecting member.

2. A load detecting device for a vehicle seat according to claim 1, wherein the stopper includes a protruding control member provided between the load sensor or the supporting base and the connecting member.

3. A load detecting device for a vehicle seat according to claim 2, wherein the protruding control member is configured by an annular member interposed between the connecting member and the supporting base and controls the deformation of the connecting member toward the supporting base, and the stopper includes another control member penetrating through the annular member and sandwiching the connecting member and the supporting base so as to control the deformation in a direction opposite to the supporting base.

4. A load detecting device for a vehicle seat according to claim 2, wherein a clearance between the load sensor or the supporting base and the protruding control member is formed such that movement of the connecting member is not blocked when a normal load is applied and the movement of the connecting member is restrained when a load, which is larger than or equal to a predetermined value, is applied.

5. A load detecting device for a vehicle seat according to claim 1, wherein the stopper includes a protruding control member provided at the connecting member so as to prevent the deformation of the connecting member by contacting with one of the load sensor and the supporting base.

6. A load detecting device for a vehicle seat according to claim 5, wherein the protruding control member is configured by an annular member interposed between the connecting member and the supporting base and controls the deformation of the connecting member toward the supporting base, and the stopper includes another control member penetrating through the annular member and sandwiching the connecting member and the supporting base so as to control the deformation in a direction opposite to the supporting base.

7. A load detecting device for a vehicle seat according to claim 1, wherein two pairs of front and rear load sensors and four stoppers are provided, and the stoppers are disposed adjacent the respective load sensors.

8. A load detecting device for a vehicle seat according to claim 1, wherein the stopper is disposed substantially centered between the at least one pair of front and rear load sensors.

9. A load detecting device for a vehicle seat according to claim 1, wherein the stopper includes a control member formed into a rib shape at a part of the connecting member.

10. A load detecting device for a vehicle seat according to claim 1, wherein the stopper includes a control member sandwiching the connecting member and the supporting base so as to control the deformation of the connecting member in a direction opposite to the supporting base.

11. A load detecting device for a vehicle seat according to claim 10, wherein the control member includes a flange that restrains the connecting member in the direction opposite to the supporting base, and a clearance between the flange and the connecting member is formed such that movement of the connecting member is not blocked when a normal load is applied and the movement of the connecting member is restrained when a load, which is larger than or equal to a predetermined value, is applied.

12. A load detecting device for a vehicle seat according to claim 10, wherein the stopper is made of at least one of an annular member provided between the load sensor and the connecting member and a bolt and a nut sandwiching the connecting member and an upper rail.

13. A load detecting device for a vehicle seat according to claim 1, wherein the supporting base has a lower rail adapted to be mounted on the floor of the vehicle and an upper rail slidably supported by the lower rail and having the load sensors mounted thereon, and the stopper includes a protruding control member provided between the load sensor or the upper rail and the connecting member.

14. A load detecting device for a vehicle seat according to claim 1, wherein the supporting base has a lower rail adapted to be mounted on the floor of the vehicle and an upper rail slidably supported by the lower rail and having the load sensors mounted thereon, and the stopper includes a control member sandwiching the connecting member and the upper rail.

15. A load detecting device for a vehicle seat according to claim 1, wherein the connecting member is positioned lower than the seat supporting member.

16. A load detecting device for a vehicle seat according to claim 1, wherein the connecting portion connects with the seat supporting member via brackets.

17. A load detecting device for a vehicle seat according to claim 1, wherein the stopper includes a flange for restraining the connecting member from deforming in a direction opposite to the supporting base.

18. A load detecting device for a vehicle seat according to claim 1, wherein the stopper preventing deformation of the connecting member prevents degradation of the load detecting functionality of the load sensors.

19. A load detecting device for a vehicle seat comprising:
a supporting base adapted to be mounted on a floor of the vehicle;
a plurality of load sensors including at least one pair of front and rear load sensors arranged along a forward and backward direction of a seat for the vehicle on the supporting base, each of the load sensors including:

a load input portion;

a deflection portion that deflects in response to a load transmitted from the load input portion; and a deflection gauge that measures an amount of deflection generated at the deflection portion, the load sensors detecting the load based on the amount of deflection measured by the deflection gauge;

a connecting member connecting the load input portions of the at least one pair of front and rear load sensors;

a seat supporting member formed separately from the connecting member and connected to the connecting member, the seat supporting member adapted to support the seat and transmit load applied to the seat to the connecting member; and a stopper made of at least one of an annular member provided between the front load sensor and the connecting member and a bolt and a nut sandwiching the connecting member and an upper rail, the at least one front load sensor located on a front side of the vehicle, and the stopper, including the nut and the bolt, located on a front side of the front load sensor.

20. A load detecting device for a vehicle seat comprising:

a supporting base mounted on a floor of the vehicle;

a plurality of load sensors including rear load sensors arranged along a forward and backward direction of a seat for the vehicle on the supporting base, each of the load sensors including:

a load input portion;

a defection portion that deflects in response to a load transmitted from the load input portion; and a deflection gauge that measures an amount of deflection generated at the deflection portion, the load sensors detecting the load based on the amount of deflection measured by the deflection gauge;

a connecting member connecting the load input portions of the load sensors;

a seat supporting member connected to the connecting member to support the seat for the vehicle, the seat supporting member transmitting load applied to the seat to the connecting member;

a plurality of fastening portions fastening the connecting member and the seat supporting member at front and rear sides of the connecting member; and a stopper formed separately from and disposed between the rear load sensor and the front side fastening portion, and that prevents deformation of the connecting member at least in a vertical direction of the seat when load exceeding a predetermined value is applied to the connecting member.

* * * * *